(12) United States Patent
Song et al.

(10) Patent No.: US 10,544,242 B2
(45) Date of Patent: Jan. 28, 2020

(54) PROCESS FOR PREPARING HIGH-PERFORMANCE POLYPROPYLENES

(71) Applicants: China Petroleum & Chemical Corporation, Beijing (CN); Beijing Research Institute of Chemical Industry, China Petroleum & Chemical Corporation, Beijing (CN)

(72) Inventors: Wenbo Song, Beijing (CN); Meifang Guo, Beijing (CN); Jinliang Qiao, Beijing (CN); Zhichao Yang, Beijing (CN); Shijun Zhang, Beijing (CN); Luqiang Yu, Beijing (CN)

(73) Assignees: China Petroleum & Chemical Corporation and Beijing Research Institute of Chemical Industry, Chaoyang District, Beijing (CN); China Petroleum & Chemical Corporation, Chaoyang District, Beijing (CN)

( * ) Notice: Subject to any disclaimer, the term of this patent is extended or adjusted under 35 U.S.C. 154(b) by 435 days.

(21) Appl. No.: 14/710,007

(22) Filed: May 12, 2015

(65) Prior Publication Data

US 2015/0246986 A1 Sep. 3, 2015

Related U.S. Application Data

(63) Continuation of application No. 12/297,857, filed as application No. PCT/CN2007/001315 on Apr. 20, 2007, now abandoned.

(30) Foreign Application Priority Data

Apr. 20, 2006 (CN) .......................... 2006 1 0076310

(51) Int. Cl.
| | |
|---|---|
| *C08F 110/06* | (2006.01) |
| *C08F 110/02* | (2006.01) |
| *C08F 2/38* | (2006.01) |
| *C08F 2/40* | (2006.01) |

(52) U.S. Cl.
CPC .......... *C08F 110/02* (2013.01); *C08F 110/06* (2013.01); *C08F 2/38* (2013.01); *C08F 2/40* (2013.01); *Y10T 428/139* (2015.01)

(58) Field of Classification Search
CPC .................................................... C08F 110/06
USPC .......................................... 526/64, 65, 351
See application file for complete search history.

(56) References Cited

U.S. PATENT DOCUMENTS

| | | | | |
|---|---|---|---|---|
| 5,066,738 A | * | 11/1991 | Ewen | C08F 10/00 502/127 |
| 5,724,222 A | * | 3/1998 | Hirano | C08J 5/18 252/567 |
| 5,844,046 A | | 12/1998 | Ohgizawa et al. | |
| 6,087,459 A | | 7/2000 | Miro et al. | |
| 6,355,741 B1 | * | 3/2002 | Marechal | B01J 8/0005 526/348.2 |
| 6,489,411 B1 | | 12/2002 | Shamshoum et al. | |
| 6,576,710 B1 | * | 6/2003 | Huovinen | C08F 10/06 525/191 |
| 6,875,826 B1 | * | 4/2005 | Huovinen | C08F 110/06 525/240 |
| 7,514,509 B2 | | 4/2009 | Marin et al. | |
| 7,531,607 B2 | * | 5/2009 | Vestberg | C08F 10/00 526/125.3 |
| 2003/0060581 A1 | * | 3/2003 | Morini | C08F 10/00 526/125.3 |
| 2006/0217501 A1 | * | 9/2006 | Migone | C08F 10/00 526/65 |
| 2009/0326171 A1 | | 12/2009 | Song et al. | |

FOREIGN PATENT DOCUMENTS

| | | |
|---|---|---|
| CN | 1985100997 A | 1/1987 |
| CN | 1091748 A | 9/1994 |
| CN | 1258680 A | 7/2000 |
| CN | 1258683 A | 7/2000 |
| CN | 1258684 A | 7/2000 |

(Continued)

OTHER PUBLICATIONS

Abedi and Hassanpour, "Preparation of bimodal polypropylene in two-step polymerization," Journal of Applied Polymer Science, vol. 101, No. 3 (Aug. 5, 2006), pp. 1456-1462.

(Continued)

*Primary Examiner* — Rip A Lee
(74) *Attorney, Agent, or Firm* — Fish & Richardson P.C.

(57) ABSTRACT

The invention discloses a process for preparing high-performance propylene polymers, the process utilizing a high activity, highly stereoselective Ziegler-Natta catalyst and two or more stages of polymerization carried out under different hydrogen concentrations to prepare propylene polymers having broad molecular weight distribution, wherein non-uniformness of isotacticity of molecular chains of the final propylene polymers is improved by adjusting or controlling stereoselectivity of catalytic active sites under different hydrogen concentrations, namely, making the low molecular weight fraction of the polymers having a higher isotacticity and making the high molecular weight fraction of the polymers having a lower isotacticity, thereby overcoming the drawbacks of the propylene polymers having broad molecular weight distribution known in the art. The resulting final polymers have excellent combined properties, in particular, remarkably improved mechanical properties.

13 Claims, No Drawings

(56) References Cited

FOREIGN PATENT DOCUMENTS

| | | | | |
|---|---|---|---|---|
| CN | 1298887 A | 6/2001 | | |
| CN | 1298888 A | 6/2001 | | |
| CN | 1330086 A | 1/2002 | | |
| CN | 1340065 A | 3/2002 | | |
| CN | 1436796 A | 8/2003 | | |
| EP | 1544218 A1 | 6/2005 | | |
| JP | 59-172507 A | 9/1984 | | |
| JP | 08-012717 | 1/1996 | | |
| JP | 08-012732 | 1/1996 | | |
| KR | 2001-057153 A | 7/2001 | | |
| WO | WO 9426794 A1 * | 11/1994 | ............. | C08F 10/06 |
| WO | WO1999016797 A1 | 4/1999 | | |
| WO | WO 00/47636 A2 * | 8/2000 | ............. | C08F 10/00 |
| WO | WO 0047636 A2 * | 8/2000 | ............. | C08F 10/00 |
| WO | WO2000047636 A2 | 8/2000 | | |
| WO | WO2000047637 A2 | 8/2000 | | |

OTHER PUBLICATIONS

Utracki and Luciani, "Rheology of polypropylene ," Polypropylene: A-Z Reference, 1999, Kluwer Publishers, Karger-Kocsis (ed.), p. 716.
European Search Report for Application No. 07720888.2 dated Apr. 12, 2012, 13 pages.
Authorized Officer Showianhong, PCT/CN2007/001315 International Search Report/Written Opinion, dated Jul. 26, 2007, 6 pages.
Authorized Officer Showianhong, PCT/CN2007/001315 International Preliminary Report on Patentability, dated Aug. 19, 2008, 7 pages.

* cited by examiner

PROCESS FOR PREPARING HIGH-PERFORMANCE POLYPROPYLENES

CROSS REFERENCE OF RELATED APPLICATION

This application is a continuation of U.S. application Ser. No. 12/297,857, filed Jun. 18, 2009, which is a National Stage application under 35 U.S.C. § 371 and claims benefit under 35 U.S.C. § 119(a) of International Application No. PCT/CN07/01315, having an International Filing Date of Apr. 20, 2007, which claims the benefit of Chinese Patent Application No. 200610076310.7, filed Apr. 20, 2006, all of which are herein incorporated in their entirety by reference.

FIELD OF THE INVENTION

The present invention relates to a process for preparing high-performance polypropolyenes, and more specifically, to a process for preparing polypropylenes having excellent performance and broad molecular weight distributions, of which high molecular weight fraction has a lower isotacticity and low molecular weight fraction has a higher isotacticity.

BACKGROUND OF THE INVENTION

In general, polypropylene resins having broad molecular weight distributions (of which polydispersity indexes as measured by a rheological method are typically larger than 4.0) exhibit better performance, because high molecular weight fraction of the resins imparts better mechanical strength, creep resistance, etc. to the resins, while low molecular weight fraction of the resins imparts excellent processability to the resins. Therefore, in some applications of high-performance polypropylene resins, such as hot-water pipes, BOPP films, etc., propylene polymers having broad molecular weight distributions are more competitive in comparison with propylene polymers having narrow molecular weight distributions.

In general, polypropylenes produced by using known high-activity Ziegler-Natta catalysts have narrower molecular weight distributions, with their polydispersity indexes (PI values) as measured by a rheological method being typically less than 4. Thus, multi-stage polymerization processes are mostly utilized to broaden the molecular weight distribution of polymers in the art, wherein the individual polymerization stages produce polymers having different molecular weight so that final polymers have broad molecular weight distribution (MWD). In each polymerization stage, the molecular weight of the polymers can be controlled by using a molecular weight control agent, such as hydrogen gas, or by altering polymerization temperature.

Such typical multi-stage polymerization processes comprise generally two or more stages of polymerization, wherein a first stage of polymerization is homopolymerization of propylene or copolymerization of propylene and an α-olefin carried out in the presence of a high-activity, highly-stereoselective Ziegler-Natta catalyst and a less amount of hydrogen, to provide a propylene homopolymer or copolymer having larger molecular weight, and a second stage of polymerization is homopolymerization of propylene or copolymerization of propylene and an α-olefin carried out, in the same reaction zone or in a different reaction zone, in the presence of the resulting polymer from the first stage of polymerization and a larger amount of hydrogen, to provide a propylene homopolymer or copolymer having less molecular weight.

It is generally accepted in the art that existing Ziegler-Natta catalysts are multi-site catalysts, in which those active sites having good hydrogen response have poor stereoselectivity, while those active sites having bad hydrogen response have good stereoselectivity. Because of this inherent characteristic of the Ziegler-Natta catalysts, isotacticities of fractions having different molecular weight of propylene polymers prepared through one-stage polymerization processes or traditional multi-stage polymerization processes (in which no means is used to adjust isotacticities of polymers produced in different polymerization stages) will be contrary to the requirements of high-performance materials, that is, low molecular weight fractions of the polymers have low isotacticities, while high molecular weight fractions of the polymers have high isotacticities. Such polymers may have many defects in the practical applications. For example, the fractions having low molecular weight and low isotacticities tend to migrate out from the interior of the materials during processing and during long-term use of articles, and thus adversely affect the performance and use of the articles. And the fractions having high molecular weight and high isotacticities tend to form thick lamellar crystal in the materials, and this is disadvantageous for some applications of propylene polymers. For example, when such resins are used to high-speed produce BOPP films, film breaking phenomenon occurs likely.

Thus, the current Ziegler-Natta catalyst-based processes for preparing propylene polymers having broad molecular weight distributions will cause the formation of a large amount of low molecular weight, low isotacticity fraction and a large amount of high molecular weight, high isotacticity fraction while broadening molecular weight distribution of the polypropylenes, so that it is impossible to obtain performance-optimized propylene polymers.

SUMMARY OF THE INVENTION

The inventors have now found a process for preparing high-performance propylene polymers, the process utilizing a high activity, highly stereoselective Ziegler-Natta catalyst and two or more stages of polymerization carried out under different hydrogen concentrations to prepare propylene polymers having broad molecular weight distribution, wherein non-uniformness of isotacticity of molecular chains of the final propylene polymers is improved by adjusting or controlling stereoselectivity of catalytic active sites under different hydrogen concentrations, namely, and making the high molecular weight fraction of the polymers having a lower isotacticity, thereby overcoming the drawbacks of the propylene polymers having broad molecular weight distribution known in the art. The resulting final polymers have excellent combined properties, in particular, remarkably improved mechanical properties.

Thus, an object of the invention is to provide a process for preparing a polypropylene having broad molecular weight distribution, the process comprising at least the following two stages of polymerization: a first stage of polymerization, which is homopolymerization of propylene or copolymerization of propylene and an α-olefin carried out in the presence of a Ziegler-Natta catalyst and a less amount of a molecular weight control agent, for example, hydrogen gas, to provide a high molecular weight fraction of the polypropylene, and a second stage of polymerization, which is homopolymerization of propylene or copolymerization of propylene and an α-olefin carried out in the presence of the resulting polymer from the first stage of polymerization and a larger amount of the molecular weight control agent, to provide a low molecular weight fraction of the polypropylene, wherein the first stage of polymerization employs optionally an external electron donor compound, and the second stage of polymerization employs an external electron donor compound, and wherein the amount and/or kind of the external electron donor compound used in the second stage of polymerization are/is selected so as to give a final polymer having an isotacticity higher than that of the polymer produced in the first stage of polymerization.

In an embodiment of the process according to the invention, a ratio of the output of the first stage of polymerization to the output of the second stage of polymerization is in a range of from about 30:70 to about 70:30, and preferably from about 35:65 to about 55:45.

In an embodiment of the process according to the invention, a ratio of the MFR value of the final propylene polymer to that of the propylene polymer prepared in the first stage of polymerization is in a range of from about 5 to about 15.

In an embodiment of the process according to the invention, a ratio of the isotacticity of the final propylene polymer to that of the propylene polymer prepared in the first stage of polymerization is larger than 1 but less than or equal to 1.2, preferably larger than 1 but less than or equal to 1.1, more preferably larger than 1 but less than or equal to 1.05, and especially preferably larger than 1 but less than or equal to 1.02.

In an embodiment of the process according to the invention, the Ziegler-Natta catalyst used in the first stage of polymerization is a reaction product of: a solid catalyst component comprising magnesium, titanium, a halogen and an internal electron donor as essential components, an organic aluminum compound, and an organic silicon compound, with a weight ratio of the organic aluminum compound to the organic silicon compound (sometimes simply referred to as Al/Ti weight ratio hereinafter) being in a range of from 10 to 300; and an additional amount of the organic silicon compound is added in the second stage of polymerization so as to give a Al/Ti weight ratio of less than the Al/Si weight ratio in the first stage of polymerization. According to a preferred aspect of this embodiment, the Al/Si weight ratio in the first stage of polymerization is about 2 to about 20 times larger than that in the second stage of polymerization.

In a preferred embodiment, the process according to the invention comprises the first and second stages of polymerization, and the first and second stages of polymerization are carried out in a first loop reactor and a second loop reactor in series, respectively. According to a preferred aspect of this embodiment, a ratio of the output of the first stage of polymerization to the output of the second stage of polymerization is approximately in a range of from 35:65 to 55:45, polymerization temperatures in the two loop reactors are controlled at 60 to 80° C., and the polymerization is conducted in a liquid phase bulk process.

Another object of the invention is to provide polypropylenes having broad molecular weight distribution obtainable by the process according to the invention. The polypropylenes having broad molecular weight distribution according to the invention have a polydispersity index of from 3 to 10, and the isotacticity of the low molecular weight fraction thereof is higher than the isotacticity of the high molecular weight fraction thereof.

Still another object of the invention is to provide biaxial oriented films, tubings, flat fibers, or injection mould articles prepared from the polypropylenes of the invention.

DETAILED DESCRIPTION OF THE PREFERRED EMBODIMENTS

The process of the invention will be described in detail below with reference to a continuous process comprising two stages of polymerization by way of example. However, it is understood that the principles of the invention are applicable alike to a batch process or a process comprising more than two stages of polymerization.

Any of high activity, highly stereoselective Ziegler-Natta catalysts for propylene polymerization known in the art can be used in the process of the invention. As used herein, the term "highly stereoselective Ziegler-Natta catalyst" refers to a catalyst capable of catalyzing polymerization of propylene to produce a propylene homopolymer having an isotactic index of more than 93%, preferably more than 94%, and more preferably more than 95%. Such catalysts comprise generally reaction products of: (1) an active solid catalyst component (also known as procatalyst or main catalyst), for example, an active titanium-containing solid catalyst component, preferably a solid catalyst component comprising magnesium, titanium, a halogen and an internal electron donor as essential components; (2) an organic aluminum compound as a cocatalyst; and (3) optionally, an external electron donor compound. These catalysts can be used directly or after having been subjected to a prepolymerization.

Solid Ziegler-Natta catalyst components (procatalysts) as well as catalysts useful in the process according to the invention have been disclosed in, for example, Chinese patent application CN85100997A, CN1258680A, CN1258683A, CN1258684A, CN1091748A, CN1330086A, CN1298887A, CN1298888A, and CN1436796A. It is particularly advantageous to employ the solid catalyst components as well as catalysts as disclosed in Chinese patent application CN1330086A, CN85100997 and CN1258683A.

As the cocatalyst component of the catalysts, the organic aluminum compounds are preferably alkyl aluminum compounds, and more preferably trialkyl aluminum compounds. Examples include, but are not limited to, trimethyl aluminum, triethyl aluminum, tri-iso-butyl aluminum, tri-isopropyl aluminum, tri-n-butyl aluminum, tri-n-hexyl aluminum, and tri-n-octyl aluminum. In the process according to the invention, the organic aluminum compounds as the cocatalyst component are used in conventional amounts. For example, the organic aluminum compound(s) is used in such an amount that a ratio of the active titanium-containing solid catalyst component to the organic aluminum compound(s) as the cocatalyst component is in a range of from 1:25 to 1:100, in terms of molar ratio of Ti to Al.

In general, in the process according to the invention, the active solid catalyst component and the organic aluminum compound are added into only the first stage of polymerization, and it is not necessary to add additionally the active solid catalyst component and the organic aluminum compound into the second stage of polymerization. However, adding the active solid catalyst component and the organic aluminum compound into both the two stages of polymerization is within the scope of the invention.

The external electron donor component of the Ziegler-Natta catalysts may be selected from the group consisting of mono- and multi-functional carboxylic acids, carboxylic anhydrides, esters of carboxylic acids, ketones, ethers, alcohols, lactones, organic phosphorus compounds, and organic silicon compounds, with organic silicon compounds being preferred. The main function of the external electron donor component is to enhance stereoselectivity of active sites of the catalysts.

Preferred organic silicon compounds useful as the external electron donor component have a formula $R_nSi(OR')_{4-n}$, in which $0<n\leq3$, R(s) is/are independently alkyl, alkenyl, cycloalkyl, aryl, or haloalkyl, having 1 to 18 carbon atoms, or a halogen or hydrogen, and R'(s) is/are independently alkyl, alkenyl, cycloalkyl, aryl, or haloalkyl, having 1 to 18 carbon atoms. Examples include, but are not limited to, trimethyl methoxy silane, trimethyl ethoxy silane, trimethyl phenoxy silane, dimethyl dimethoxy silane, dimethyl diethoxy silane, methyl tert-butyl dimethoxy silane, isopropyl methyl dimethoxy silane, diphenoxy dimethoxy silane, diphenyl diethoxy silane, phenyl trimethoxy silane, phenyl triethoxy silane, vinyl trimethoxy silane, cyclohexyl methyl dimethoxy silane, dicyclopentyl dimethoxy silane, di-isopropyl dimethoxy silane, di-isobutyl dimethoxy silane, 2-ethylpiperidino tert-butyl dimethoxy silane, (1,1,1-trifluoro-2-propyl) 2-ethylpiperidino dimethoxy silane, (1,1,1-trifluoro-2-propyl) methyl dimethoxy silane, and the like.

In the process for preparing polypropylenes having broad molecular weight distribution according to the invention, it is required that the active sites of the catalysts have a higher stereoselectivity under high concentration of a molecular weight control agent, for example, hydrogen gas than that under low concentration of the molecular weight control agent. Thus, feasible manners of using the external electron donor compounds include, for example, (1) no external electron donor compound is used in the first stage of polymerization, while an external electron donor compound is used in the second stage of polymerization; (2) a less amount of an external electron donor compound is used in the first stage of polymerization, while a larger amount of the external electron donor compound is used in the second stage of polymerization; and (3) an external electron donor compound providing a polymer having a lower isotacticity is used in the first stage of polymerization, while an external electron donor compound providing a polymer having a higher isotacticity is added in the second stage of polymerization. With using the external electron donor compounds in such manners, the low molecular weight fraction of the produced polypropylenes will have higher isotactic index (isotacticity) while the high molecular weight fraction of the produced polypropylenes will have lower isotactic index (isotacticity).

In a preferred embodiment, the same organic silicon compound is used as the external electron donor component in the first and second polymerization stages of the process according to the invention, but the concentration of the organic silicon compound in the second polymerization stage is larger than that in the first polymerization stage. In a more preferred embodiment, a weight ratio of the organic aluminum compound to the organic silicon compound in the first stage of polymerization is controlled as being in a range of from 10 to 300, and preferably from 30 to 150, and the weight ratio of the organic aluminum compound to the organic silicon compound in the second stage of polymerization is made less than that in the first stage of polymerization by adding an additional amount of the organic silicon compound. Preferably, the Al/Si weight ratio in the first stage of polymerization is 2 to 20 times larger than that in the second stage of polymerization.

It is noted that, in techniques as disclosed in literatures for preparing propylene polymers having broad molecular weight distribution through multi-stage polymerization, no means is employed to adjust stereoselectivities of the active sites of the catalysts in different polymerization stages so that the isotacticity of the high molecular weight fraction of the resulting polymers is higher than that of the low molecular weight fraction of the polymers. In contrary, in the process according to the invention, the isotacticity of the low molecular weight fraction of the propylene polymers is made higher than the isotacticity of the high molecular weight fraction of the propylene polymers produced in the first polymerization stage by enhancing stereoselectivities of the active sites of the catalysts in the second polymerization stage for producing the low molecular weight fraction of the polymers. The isotacticity of polypropylenes may be characterized by an isotactic index as measured according to GB 2142-89, or by two parameters as measured by $^{13}$C-NMR spectroscopy, i.e., pentad ([mmmm]) content by mole and average length of isotactic sequences. The larger the values measured by these methods, the higher the isotacticity of the polypropylene. Such data can demonstrate the effects of the invention.

In the process for preparing polypropylenes having broad molecular weight distribution according to the invention, the first and second stages of polymerization are performed under different concentrations of a molecular weight control agent, for example, hydrogen gas, in order to make the final propylene polymers having broadened molecular weight distribution. In general, melt flow rate (MFR) of a final polymer may be controlled depending on the intended use of the polymer, and the MFR of the propylene polymer produced in the first polymerization stage can be so controlled that a ratio of the MFR of the final propylene polymer to the MFR of the propylene polymer produced in the first polymerization stage is in a range of from about 5 to about 15. For example, when the final polymer will be used as a tubing material, the MFR of the propylene polymer produced in the first polymerization stage can be controlled as being in a range of from 0.01 to 0.03 g/10 min., and the MFR of the final propylene polymer can be controlled as being in a range of from 0.1 to 0.3 g/10 min.; and when the final polymer will be used as a film material, the MFR of the propylene polymer produced in the first polymerization stage can be controlled as being in a range of from 0.2 to 0.4 g/10 min., and the MFR of the final propylene polymer can be controlled as being in a range of from 2 to 4 g/10 min. The MFR values are measured according to ISO1133, at 230° C., under 2.16 kg loading.

In the process according to the invention, a ratio of the output of the first stage of polymerization to the output of the second stage of polymerization may be in a range of from 30:70 to 70:30, preferably from 35:65 to 55:45.

The polymerization can be carried out in a liquid phase process, or in a gas phase process, or in a combination process of gas phase and liquid phase. In the case where the polymerization is carried out in liquid phase, polymerization temperature is in a range of from 0° C. to 150° C., and preferably from 40° C. to 100° C., and polymerization pressure is higher than saturated vapor pressure of propylene at the corresponding polymerization temperature. In the case where the polymerization is carried out in gas phase, polymerization temperature is in a range of from 0° C. to 150° C., and preferably from 40° C. to 100° C., and polymerization pressure may be normal pressure or higher, and preferably in a range of from 1.0 to 3.0 MPa (gauge, similarly hereinafter).

Comonomers which may copolymerize with propylene in the process according to the invention include ethylene and $C_4$-$C_{12}$ α-olefins, for example, 1-butene, 1-hexene, and 1-octene.

As mentioned above, the process of the invention may be performed in either a continuous process or a batch process. In the case where a continuous process is employed, the process of the invention may be performed in two or more loop reactors in series, or in two or more tank reactors in series, or in two or more gas phase reactors in series, or in any combination of a loop reactor, a tank reactor, and a gas phase reactor. In the case where the first stage of polymerization is a continuous liquid phase polymerization, it is preferable to subject the catalyst to a continuous or batch prepolymerization. By subjecting the catalyst to propylene prepolymerization, it is possible to control effectively particle morphology of the polymers during the reaction, to reduce breaking of polymer particles, and for the catalyst to exert effectively its catalytic activity. The prepolymerization is generally conducted under mild conditions, wherein polymerization temperature is preferably lower than 30° C., and prepolymerization rate is controlled as being in a range of from 3 to 1000 grams of PP per gram of the catalyst. In the case where the first stage of polymerization is a continuous gas phase polymerization, the catalyst may or may not be subjected to a prepolymerization.

In a particularly preferred embodiment, the process for preparing polypropylenes having broad molecular weight distributions according to the invention is one comprising successively performing homopolymerization or copolymerization of propylene in two loop reactors in series in the presence of a highly-stereoselective Ziegler-Natta catalyst, which comprises a reaction product of an active titanium-containing solid catalyst component, an organic aluminum compound and an organic silicon compound, wherein in the first loop reactor, a weight ratio of the organic aluminum compound to the organic silicon compound (also simply referred to as Al/Si weight ratio) is in a range of from 10 to 300, preferably from 30 to 150; an additional amount of the organic silicon compound is added in the second loop reactor so that a Al/Si weight ratio in the second loop reactor is less than that in the first loop reactor, preferably 2 to 20 times less than that in the first loop reactor; a concentration of a molecular weight control agent in the second loop reactor is larger than that in the first loop reactor; a ratio of the output of the first loop reactor to the output of the second loop reactor is approximately in a range of from 35:65 to 55:45; polymerization temperatures in the two loop reactors are controlled at 60 to 80° C.; and the polymerization is a liquid phase bulk polymerization.

Another aspect of the invention relates to polymers produced by the above-described process of the invention. The polymers according to the invention have broad molecular weight distribution, with polydispersity index being in a range of from 3 to 10, and preferably from 4 to 8, and the isotacticity of the low molecular weight fraction thereof is higher than the isotacticity of the high molecular weight fraction thereof. The polymers according to the invention have excellent combined properties, in particular, remarkably improved mechanical properties. Additionally, since the low molecular weight fraction of the propylene polymers has a relatively high isotacticity, the problem that the low molecular weight fraction migrates out from the interior of materials during the processing of the resins or during the long-term use of articles is removed.

The propylene polymers according to the invention may be further processed by processes well known in the art. For example, the polymers may be pelletized through conventional equipment. During the palletizing, additives commonly used in the art, such as antioxidants, light stabilizers, thermal stabilizers, colorants, and/or fillers can be added into the polymers.

The pelletized or un-pelletized polymers of the invention can be used in various possible applications of polypropylenes, such as biaxial oriented films, tubings, flat fibers, or injection mould articles.

Thus, another aspect of the invention relates to the articles prepared from the polypropylenes of the invention.

EXAMPLES

The invention will be described in detail with reference to specific examples, which are illustrative but not restrictive.

The property data of the polymers given in the examples were obtained as follows:
1. Isotactic index: measured according to a method described in GB 2412-89.
2. Pentad ([mmmm]) content by mole and average length of isotactic sequences (Nm): measured by Nuclear Magnetic Resonance Spectrometer Model AVANCE 400 from Bruker Co., Germany. A sample was dissolved in deuterated o-dichlorobenzene at 140° C., and measuring temperature was 125° C. Experimental operation, assignment of peaks and date treatment followed those as disclosed in literatures (see, for example, James C. Randall, Polymer Sequence Determination: [13]Carbon NMR Method, Academic, New York, 1977).
3. Melt flow rate (MFR): measured according to ISO1133-05, 230° C., 2.16 kg loading.
4. Polydispersity index: viscosities and moduli of a sample were measured on ARES rheometer from Rheometric Scientific Inc., USA equipped with a plate clamp at 190° C. over a certain frequency range. Polydispersity index (PI) was calculated as $PI=10^5/G$, in which G is a modulus value at the crossing of the storage modulus (G') verse frequency curve and the loss modulus (G") verse frequency curve. Prior to the measurement, the resin sample was compression mould at 200° C. into a plate of 2 mm thickness (see L. A. Utracki and A. Luciani, Rheology of polypropylene in Karger-Kocsis J., ed., Polypropylene: A-Z Reference, Dordrecht: Kluwer Publishers, 1999, 716).
5. Tensile strength of resin: measured according to ASTM D638-00.
6. Flexural modulus of resin: measured according to ASTM D790-97.
7. Izod impact strength: measured according to ASTM D256-00.

Example 1

A main catalyst (active titanium-containing solid catalyst component) was prepared by the process described in Example 1 of Chinese patent application CN93102795. The main catalyst was found to have a Ti content of 2.4 wt %, a Mg content of 18.0 wt %, and a di-n-butyl phthalate content of 13 wt %.

Polymerization was performed in a polypropylene pilot plant using two 75 L loop polymerization reactors. The main catalyst, cocatalyst (i.e., triethylaluminum), and external electron donor (i.e., cyclohexyl methyl dimethoxy silane) pre-contacted with each other at 10° C. for one minute, and then were continuously fed into a 2 L prepolymerization reactor to conduct prepolymerization. Flow rate of each raw material fed into the prepolymerization reactor was 5.29 g/hr for triethyl aluminum, 0.13 g/hr for cyclohexyl methyl dimethoxy silane, 0.01 g/hr for the main catalyst, and 11 kg/hr for propylene. Prepolymerization temperature was 15° C., prepolymerization pressure was 4.1 MPa, and residence time was 6 minutes.

The stream from the prepolymerization reactor was continuously fed into the first reactor of the two loop reactors in series, to catalyze homopolymerization of propylene. Al/Si weight ratio in the first loop reactor was 40. Polymerization temperature in the two loop reactors was 70° C., pressure in the two loop reactors was 4.1 MPa, and residence time was 1.1 hours for the first loop reactor and 0.8 hours for the second loop reactor. Propylene was fed into the first loop reactor at a flow rate of 23 kg/hr and into the second loop reactor at a flow rate of 12 kg/hr. The feed to the first loop reactor contained hydrogen gas at a concentration of 180 ppm by volume, and additional hydrogen gas was added into the feed to the second loop reactor so that hydrogen gas concentration reached 2600 ppm by volume. Additional cyclohexyl methyl dimethoxy silane was fed into the second loop reactor at a flow rate of 0.4 g/hr, so that Al/Si weight ratio in the second loop reactor was 10. The ratio of the output of the first loop reactor to the output of the second loop reactor was 45:55.

To the powdery polymer resulted from the polymerization were added 0.1 wt % of IRGAFOS 168, 0.2 wt % of IRGANOX 1010 and 0.05 wt % of calcium stearate, and the resulting mixture was pelletized through a twin screw extruder. Properties of the resultant pellets were measured and the results are shown in the Table 1 below.

Example 2

The procedure as described in the Example 1 was followed, except that the flow rate of cyclohexyl methyl dimethoxy silane fed to the prepolymerization reactor was changed to 0.06 g/hr so that Al/Si weight ratio in the first loop reactor was 80, and additional cyclohexyl methyl dimethoxy silane was fed into the second loop reactor at a flow rate of 0.47 g/hr, so that Al/Si weight ratio in the second loop reactor was 10. The results of property measurement are shown in the Table 1.

Example 3

The procedure as described in the Example 1 was followed, except that the hydrogen concentration in the feed to the first loop reactor was controlled at 80 ppm by volume, and the hydrogen concentration in the feed to the second loop reactor was controlled at 5200 ppm by volume. The results of property measurement are shown in the Table 1.

Comparative Example 1

The procedure as described in the Example 1 was followed, except that cyclohexyl methyl dimethoxy silane as external electron donor was fed into only the prepolymerization reactor at a flow rate of 0.13 g/hr (in order words, no cyclohexyl methyl dimethoxy silane was added into the second loop reactor), so that Al/Si weight ratio in both the two loop reactors was 40.

Comparative Example 2

The procedure as described in the Example 1 was followed, except that cyclohexyl methyl dimethoxy silane as external electron donor was fed into only the prepolymerization reactor at a flow rate of 0.53 g/hr (in order words, no cyclohexyl methyl dimethoxy silane was added into the second loop reactor), so that Al/Si weight ratio in both the two loop reactors was 10.

It can be seen from the data obtained in the Examples and the Comparative Examples that polymers having better combined properties, in particular, remarkably improved mechanical properties can be obtained by adjusting stereoselectivities of active sites of the catalyst under different hydrogen concentrations, namely, increasing the amount of the external electron donor component used in the second polymerization stage for producing low molecular weight fraction of the polymers so as to make a ratio of the isotacticity of the final polymer to the isotacticity of the propylene polymer produced in the first polymerization stage larger than 1.

TABLE 1

Process Conditions for Examples 1-4 and Comparative Examples 1-2 and properties of resins

| | | Example 1 | | Example 2 | | Example 3 | | Comparative Example 1 | | Comparative Example 2 | |
|---|---|---|---|---|---|---|---|---|---|---|---|
| | | 1# Loop Reactor | 2# Loop Reactor | 1# Loop Reactor | 2# Loop Reactor | 1# Loop Reactor | 2# Loop Reactor | 1# Loop Reactor | 2# Loop Reactor | 1# Loop Reactor | 2# Loop Reactor |
| Process conditions | | | | | | | | | | | |
| H$_2$ concentration in the feed | ppmv | 180 | 2600 | 180 | 2600 | 80 | 5200 | 180 | 2600 | 180 | 2600 |
| Al/Si weight ratio* | wt/wt | 40 | 10 | 80 | 10 | 40 | 10 | 40 | 40 | 10 | 10 |
| Product | | | | | | | | | | | |
| MFR | g/10 min | 0.75 | 2.8 | 0.82 | 2.9 | 0.36 | 2.6 | 0.73 | 3.1 | 0.84 | 2.7 |
| Isotacticity | wt % | 96.3 | 96.7 | 94.5 | 95.2 | 96.8 | 96.9 | 96.6 | 96.5 | 98.8 | 97.6 |
| Nm measured by $^{13}$C-NMR | | 31.1 | 36.8 | 27.9 | 33.5 | 31.6 | 39.4 | 32.5 | 32.0 | 53.6 | 53.2 |
| [mmmm] content measured by $^{13}$C-NMR | mol % | 82.3 | 84.7 | 81.2 | 83.6 | 83.1 | 85.1 | 83.3 | 83.2 | 88.7 | 88.7 |
| Polydispersity index (PI) | | 5.7 | | 5.8 | | 6.8 | | 5.8 | | 5.7 | |
| Tensile strength | MPa | 35.4 | | | | | | 35.1 | | | |
| Flexural strength | MPa | 38.2 | | | | | | 29.5 | | | |
| Flexural modulus | GPa | 1.39 | | | | | | 1.11 | | | |
| IZOD notched impact strength | J/m | 52 | | | | | | 53 | | | |

*Weight ratio of triethyl aluminum to cyclohexyl methyl dimethoxy silane
**The product of 1# Loop Reactor or 2# Loop Reactor means a sample taken from corresponding reactor.

The patents, patent applications, non-patent literatures and testing methods cited in the specification are incorporated herein by reference.

While the invention has been described with reference to exemplary embodiments, it will be understood by those skilled in the art that various changes and modifications may be made without departing from the spirit and scope of the invention. Therefore, the invention is not limited to the particular embodiments disclosed as the best mode contemplated for carrying out this invention, but the invention will include all embodiments falling within the scope of the appended claims.

What is claimed is:

1. A process for preparing a polypropylene having a polydispersity index of from 3 to 10, the process comprising at least the following two stages of polymerization: a first stage of polymerization, which is homopolymerization of propylene carried out in the presence of a Ziegler-Natta catalyst and a lesser amount of a molecular weight control agent, to provide a high molecular weight fraction of the polypropylene; and a second stage of polymerization, which is homopolymerization of propylene carried out in the presence of resulting polymer from the first stage of polymerization and a larger amount of the molecular weight control agent, to provide a low molecular weight fraction of the polypropylene, wherein: (1) no external electron donor compound is used in the first stage of polymerization, while an external electron donor compound is used in the second stage of polymerization; (2) an amount of an external electron donor compound is used in the first stage of polymerization, while an amount of the external electron donor compound, which is larger than that employed in the first stage of polymerization, is used in the second stage of polymerization; or (3) an external electron donor compound providing a polymer having a first isotacticity is used in the first stage of polymerization, while an external electron donor compound providing a polymer having a second isotacticity, which is higher than the first isotacticity, is added in the second stage of polymerization, to give a final polymer having an isotacticity higher than that of the polymer produced in the first stage of polymerization, wherein a ratio of the output of the first stage of polymerization to the output of the second stage of polymerization is in a range of from 30:70 to 70:30, wherein a ratio of a MFR value of the final polymer to a MFR value of the propylene polymer prepared in the first stage of polymerization is in a range of from 5 to 15; and wherein a weight ratio of an organic aluminum compound to an organic silicon compound in the first stage of polymerization is 2 to 20 times larger than that in the second stage of polymerization.

2. The process according to claim 1, wherein a ratio of the isotacticity of the final polymer to the isotacticity of the propylene polymer prepared in the first stage of polymerization is larger than 1 but less than or equal to 1.2.

3. The process according to claim 1, wherein the Ziegler-Natta catalyst used in the first stage of polymerization is a reaction product of: a solid catalyst component comprising magnesium, titanium, a halogen and an internal electron donor as essential components, an organic aluminum compound, and an organic silicon compound, with a weight ratio of the organic aluminum compound to the organic silicon compound being in a range of from 10 to 300, and wherein an additional amount of the organic silicon compound is added in the second stage of polymerization so as to give a weight ratio of the organic aluminum compound to the organic silicon compound less than that in the first stage of polymerization.

4. The process according to claim 3, wherein the weight ratio of the organic aluminum compound to the organic silicon compound in the first stage of polymerization is 2 to 20 times larger than that in the second stage of polymerization.

5. The process according to claim 1, wherein the ratio of the output of the first stage of polymerization to the output of the second stage of polymerization is in a range of from about 35:65 to about 55:45, polymerization temperatures in the two loop reactors are controlled at 60 to 80° C., and the polymerization is conducted in a liquid phase bulk process.

6. The process according to claim 1, wherein the process comprises successively performing homopolymerization of propylene in two loop reactors in series in the presence of a Ziegler-Natta catalyst, which comprises a reaction product of an active titanium-containing solid catalyst component, an organic aluminum compound, and an organic silicon compound, to produce a propylene homopolymer having an isotactic index of more than 93%, wherein in the first loop reactor, a weight ratio of the organic aluminum compound to the organic silicon compound is in a range of from 10 to 300; an additional amount of the organic silicon compound is added in the second loop reactor so that a weight ratio of the organic aluminum compound to the organic silicon compound in the second loop reactor is less than that in the first loop reactor; a concentration of a molecular weight control agent in the second loop reactor is larger than that in the first loop reactor; a ratio of the output of the first loop reactor to the output of the second loop reactor is in a range of from about 35:65 to about 55:45; polymerization temperatures in the two loop reactors are controlled at 60 to 80° C.; and the polymerization is a liquid phase bulk polymerization.

7. The process according to claim 6, wherein the weight ratio of the organic aluminum compound to the organic silicon compound in the first loop reactor is 2 to 20 times larger than that in the second loop reactor.

8. A polypropylene prepared by the process as claimed in claim 1.

9. A polypropylene prepared by the process as claimed in claim 6.

10. The polypropylene of claim 8, which has a polydispersity index of 3 to 10, and of which the isotacticity of the low molecular weight fraction is higher than the isotacticity of the high molecular weight fraction.

11. Biaxial oriented films, tubings, flat fibers, or injection mould articles prepared from the polypropylene as claimed in claim 8.

12. Biaxial oriented films, tubings, flat fibers, or injection mould articles prepared from the polypropylene as claimed in claim 9.

13. Biaxial oriented films, tubings, flat fibers, or injection mould articles prepared from the polypropylene as claimed in claim 10.

* * * * *